Feb. 21, 1933. C. E. LUCKE 1,898,196
DOUBLE CIRCUIT FORCED CIRCULATION WATER TUBE BOILER
Filed Jan. 3, 1927 13 Sheets-Sheet 1
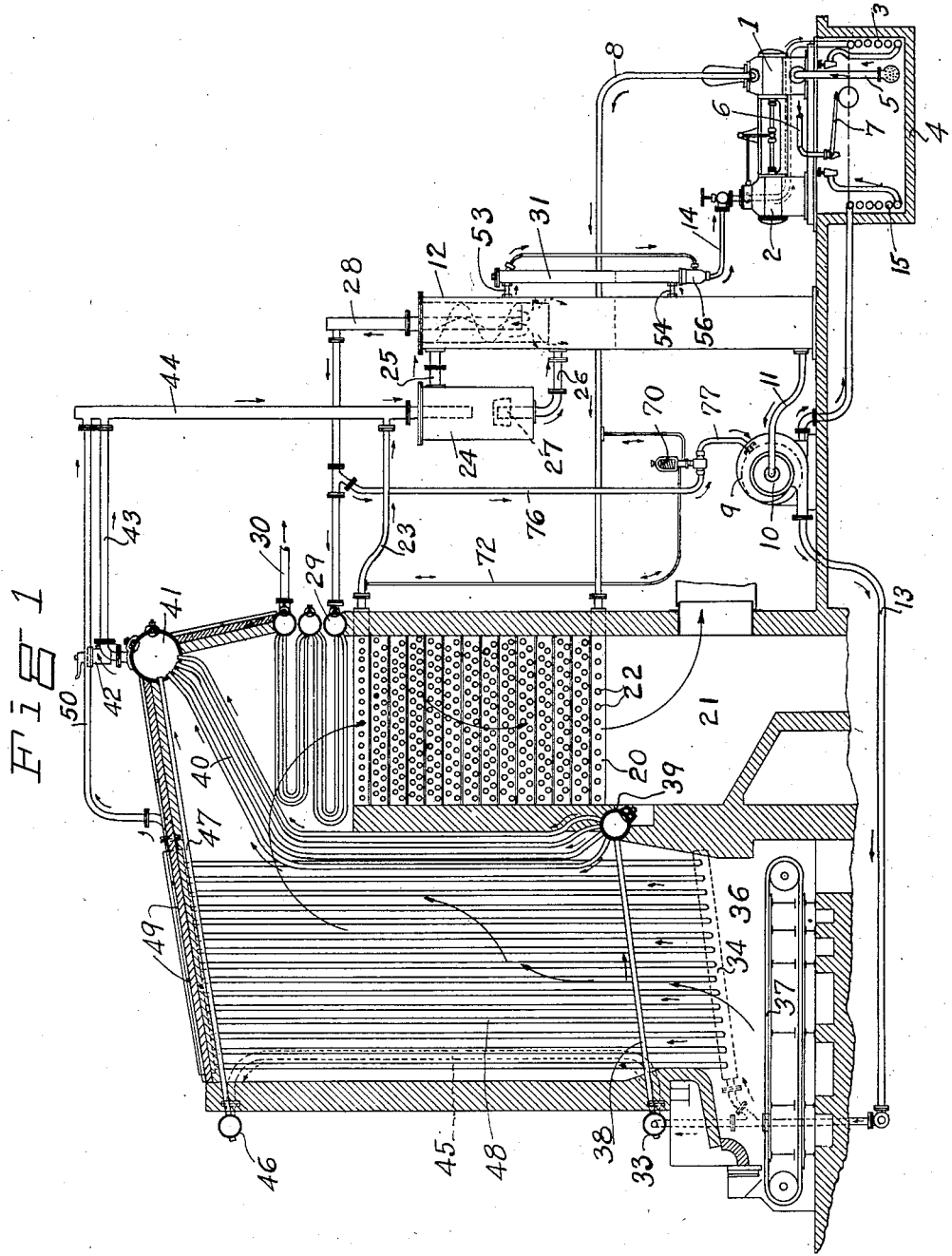
INVENTOR
Charles E Lucke
BY
Gifford + Scull
ATTORNEY Feb. 21, 1933.　　　C. E. LUCKE　　　1,898,196
DOUBLE CIRCUIT FORCED CIRCULATION WATER TUBE BOILER
Filed Jan. 3, 1927　　　13 Sheets-Sheet 2
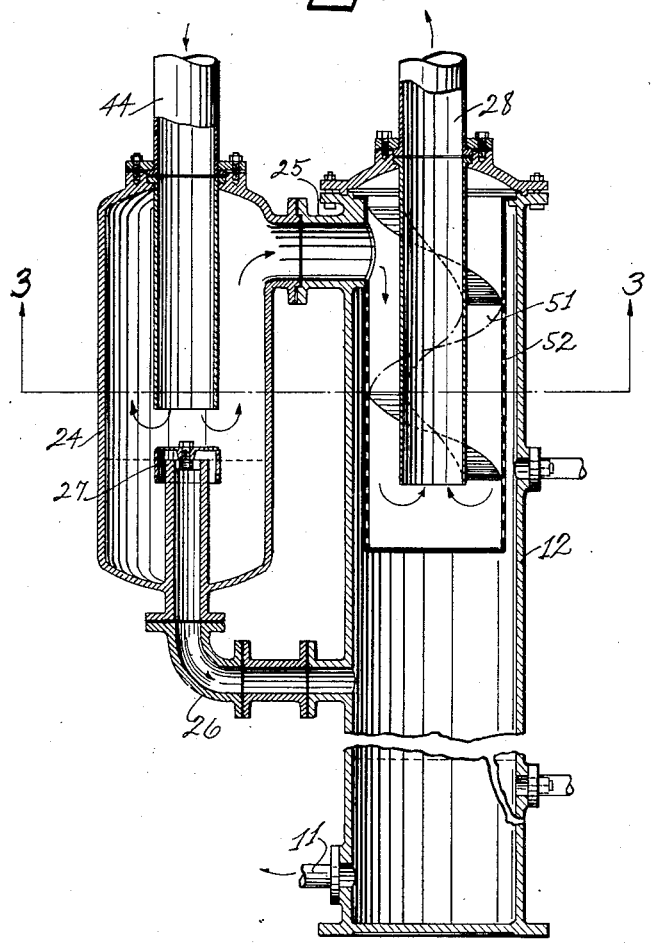
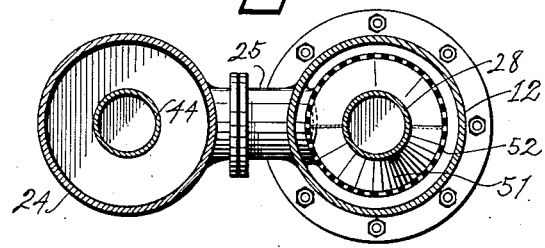
Charles E. Lucke INVENTOR
BY
Gifford & Scull ATTORNEYS

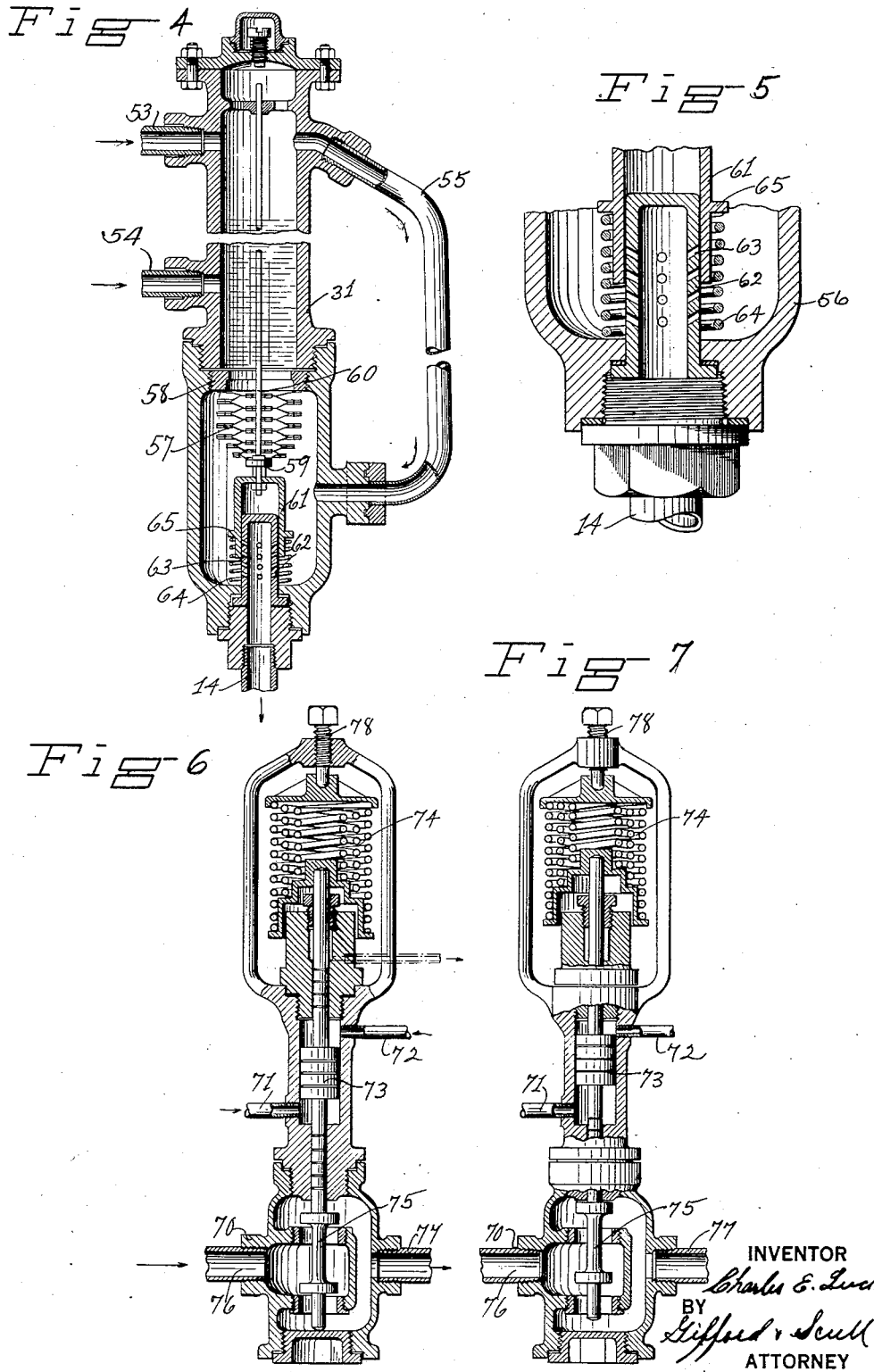

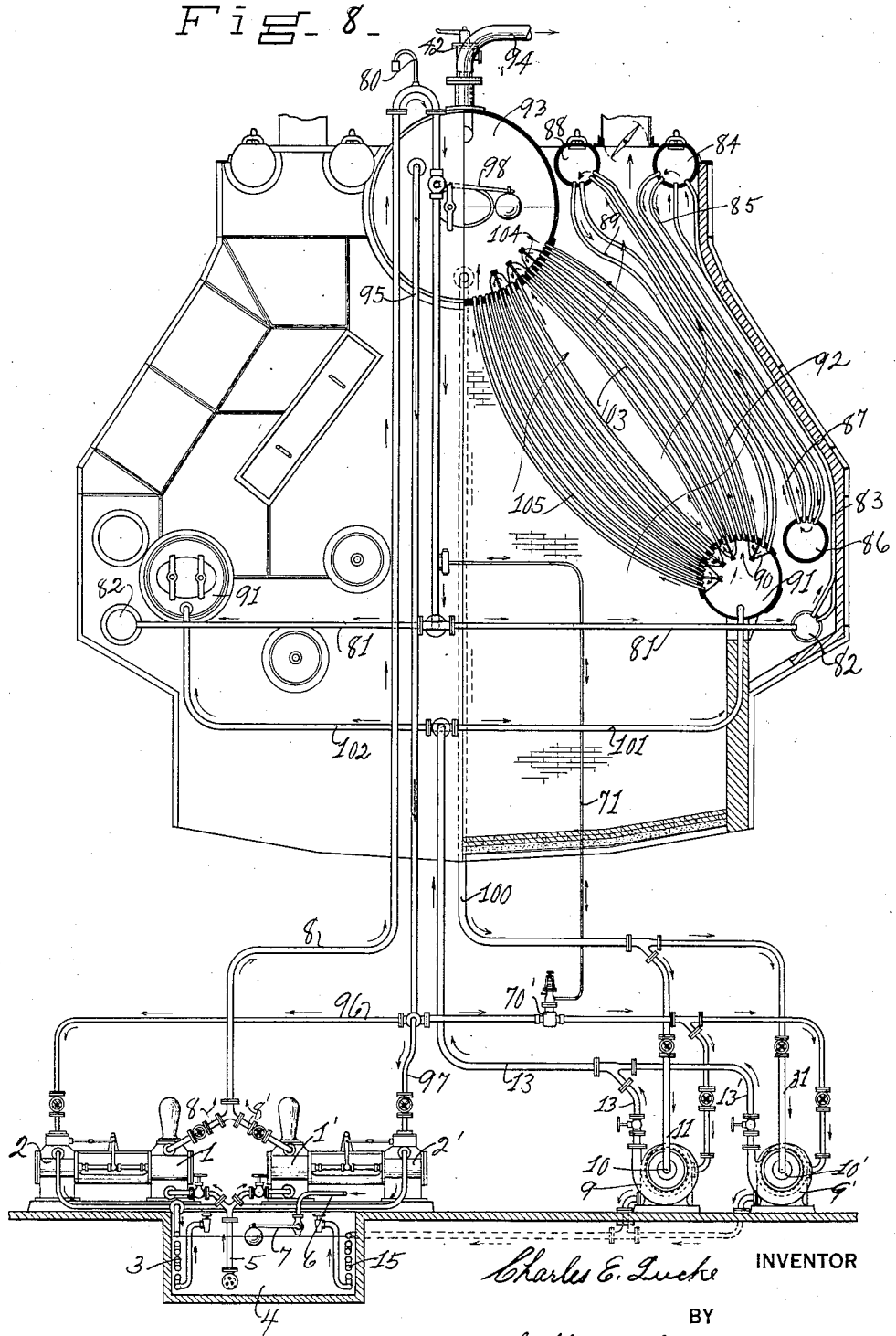

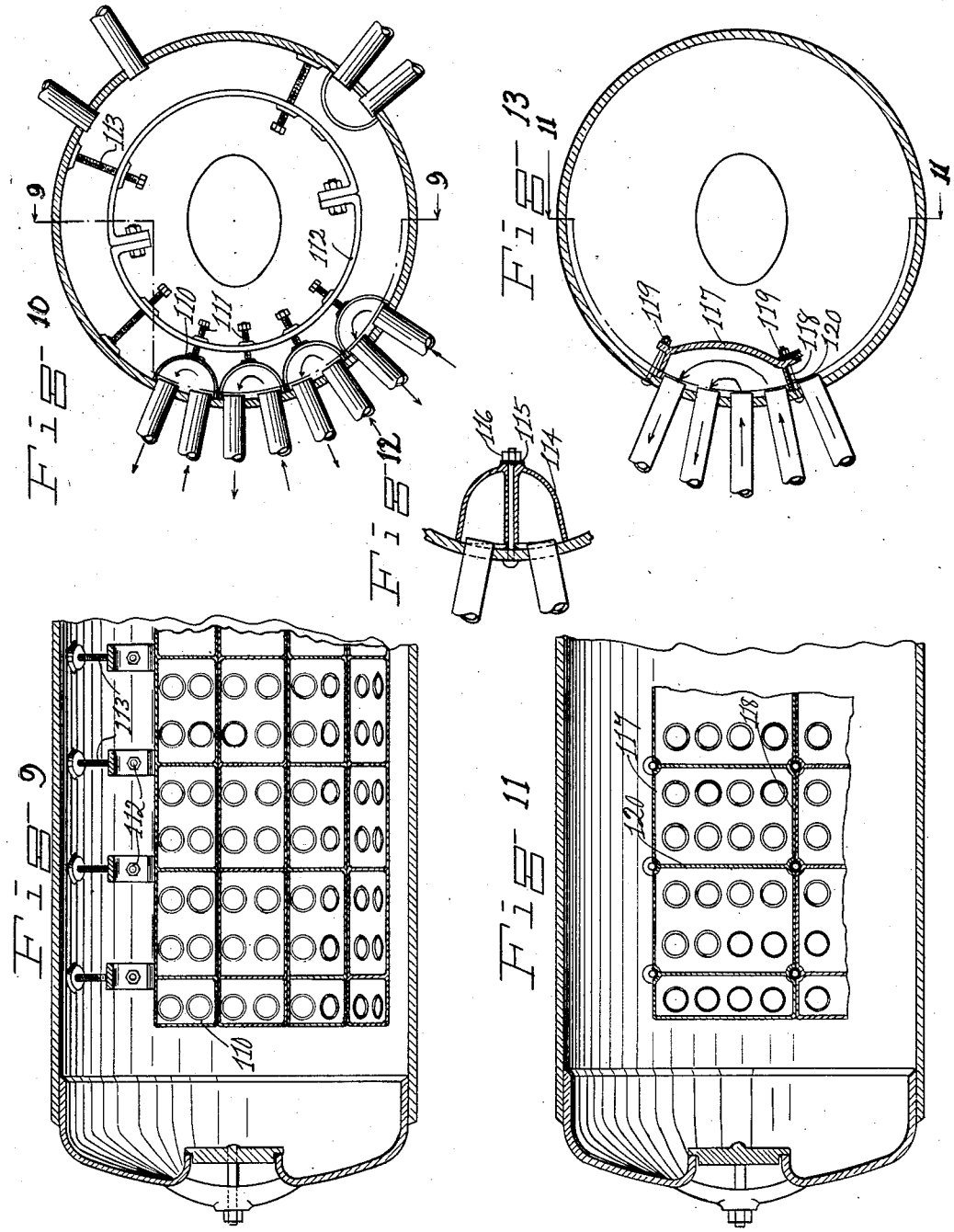

Feb. 21, 1933.   C. E. LUCKE   1,898,196
DOUBLE CIRCUIT FORCED CIRCULATION WATER TUBE BOILER
Filed Jan. 3, 1927   13 Sheets-Sheet 6
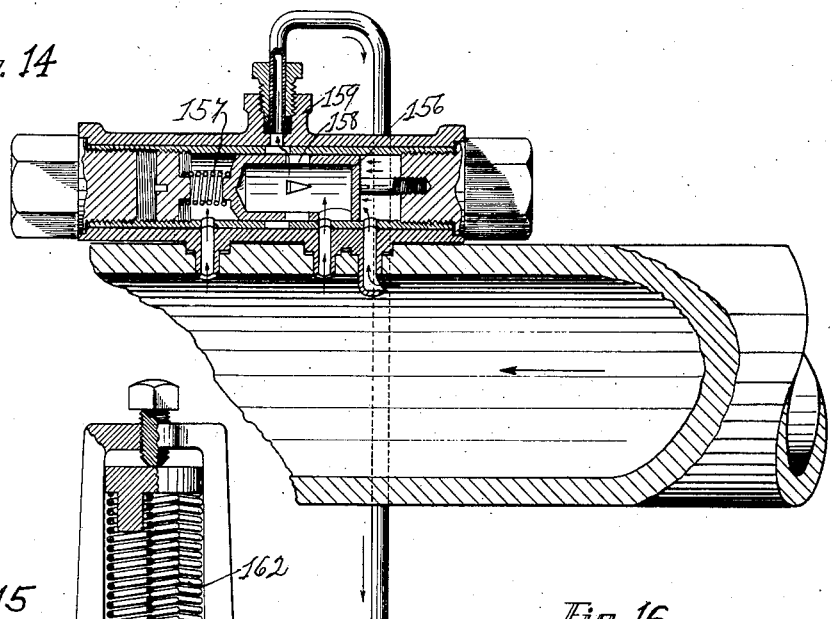
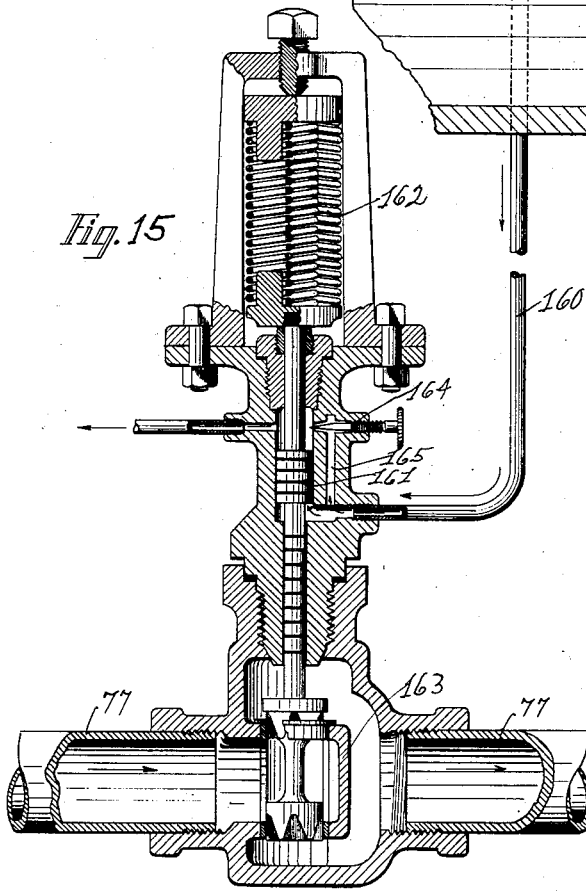
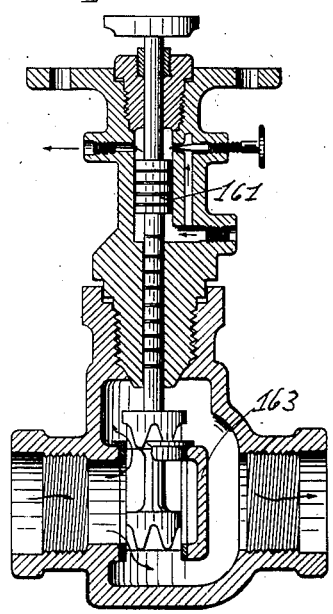
Charles E. Lucke   INVENTOR
BY
Gifford & Scull   ATTORNEYS Feb. 21, 1933.  C. E. LUCKE  1,898,196
DOUBLE CIRCUIT FORCED CIRCULATION WATER TUBE BOILER
Filed Jan. 3, 1927  13 Sheets-Sheet 7
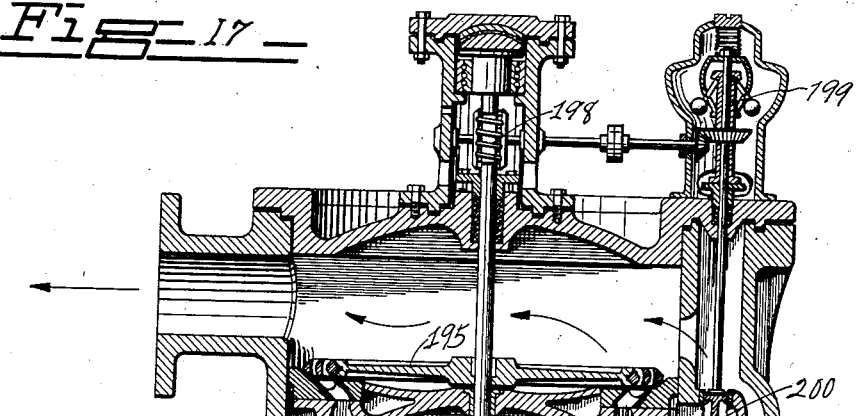
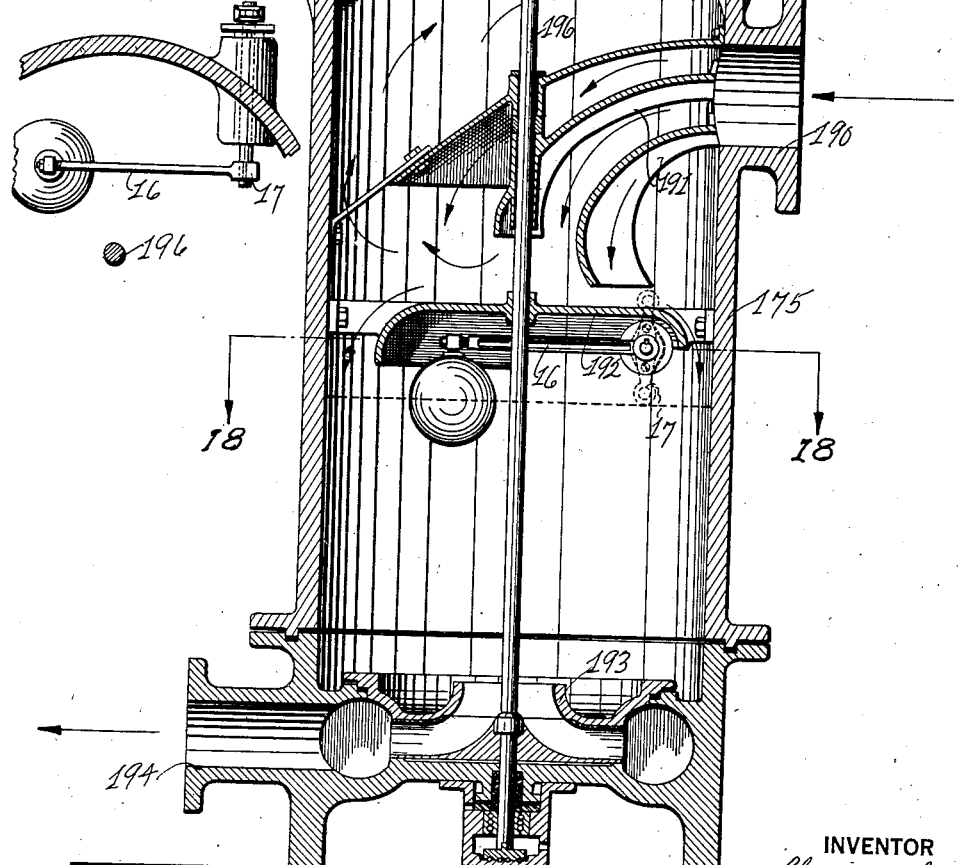
INVENTOR
Charles E. Lucke
BY
Gifford & Scull
ATTORNEYS

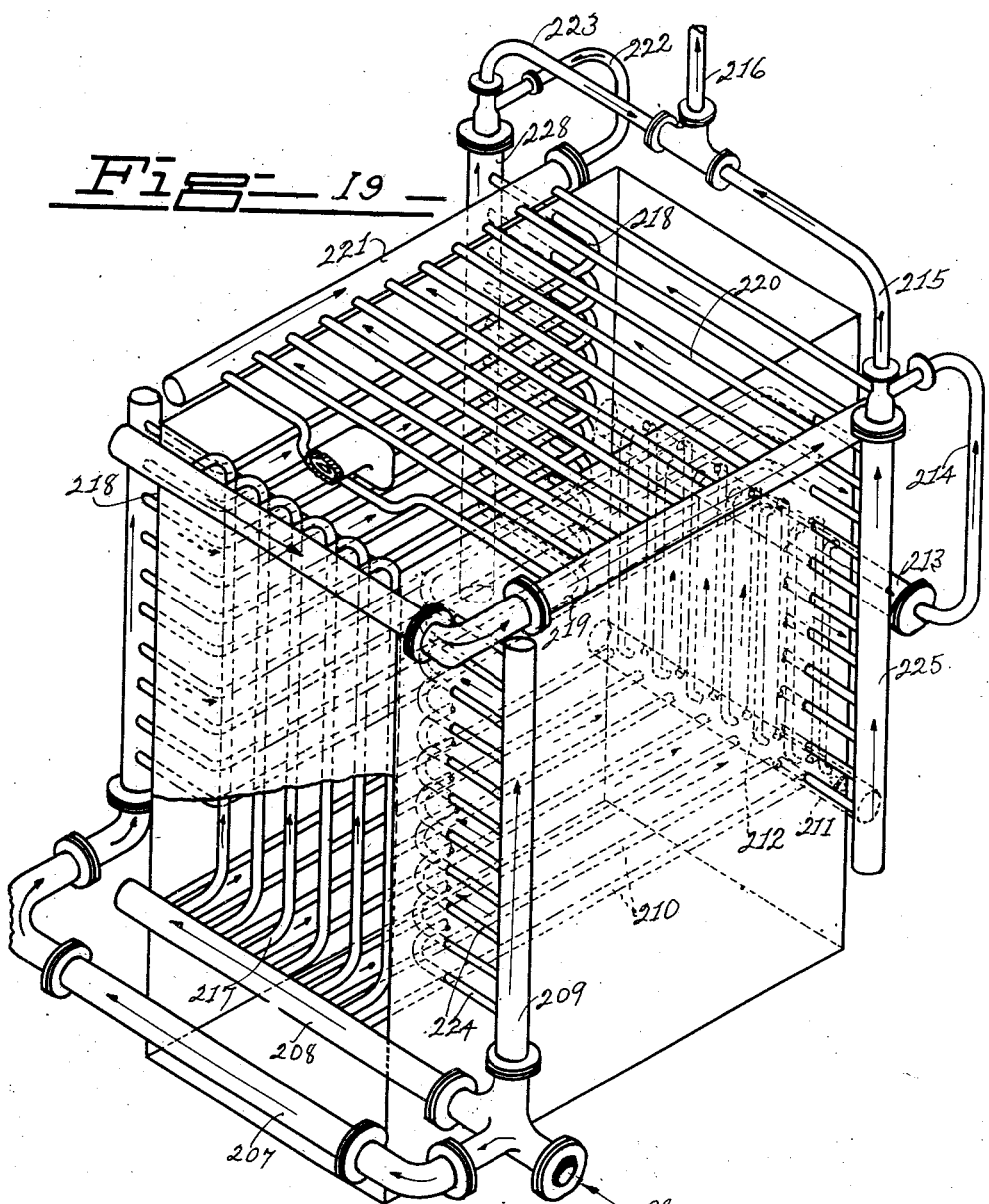

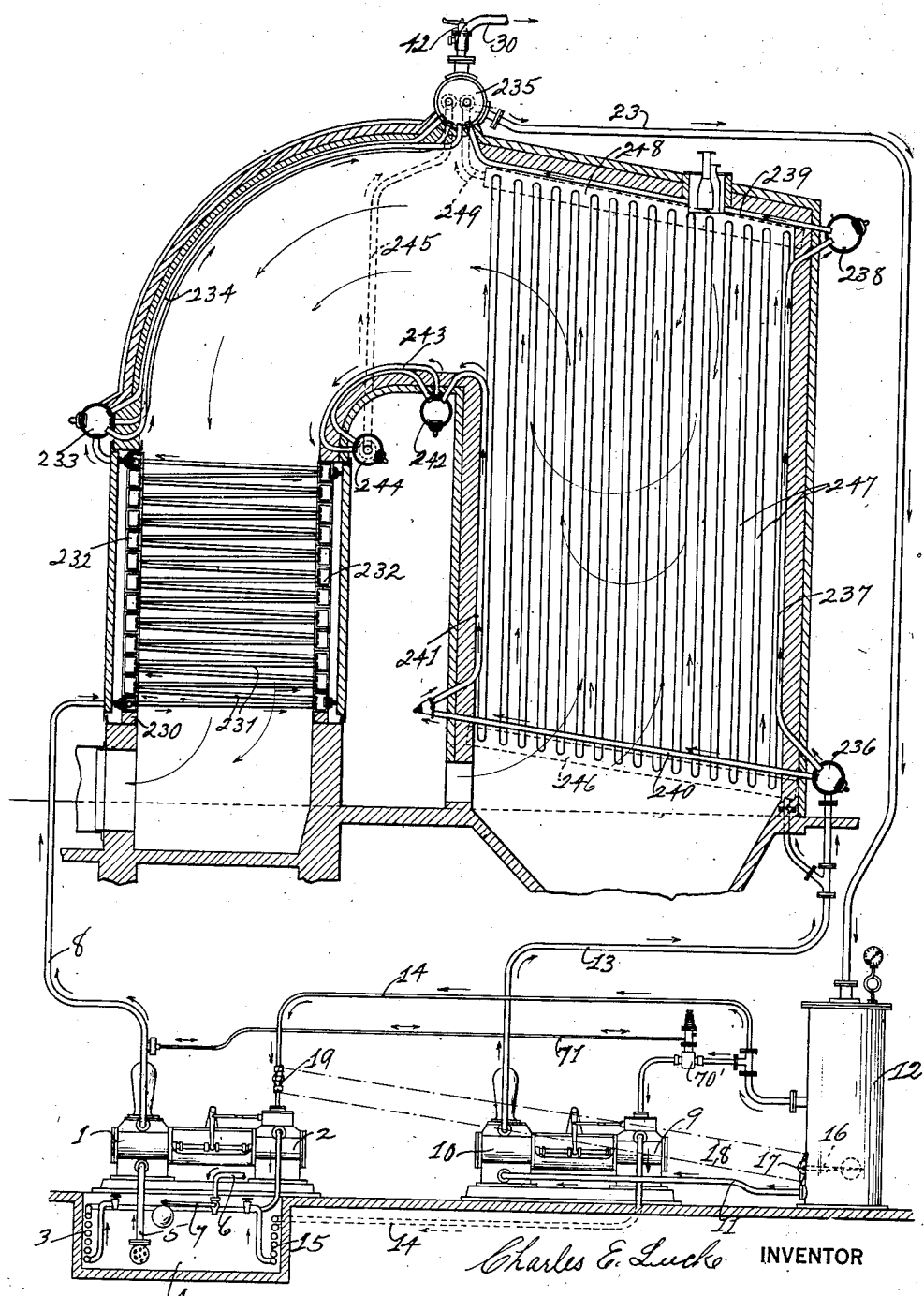

Feb. 21, 1933.   C. E. LUCKE   1,898,196
DOUBLE CIRCUIT FORCED CIRCULATION WATER TUBE BOILER
Filed Jan. 3, 1927   13 Sheets-Sheet 10
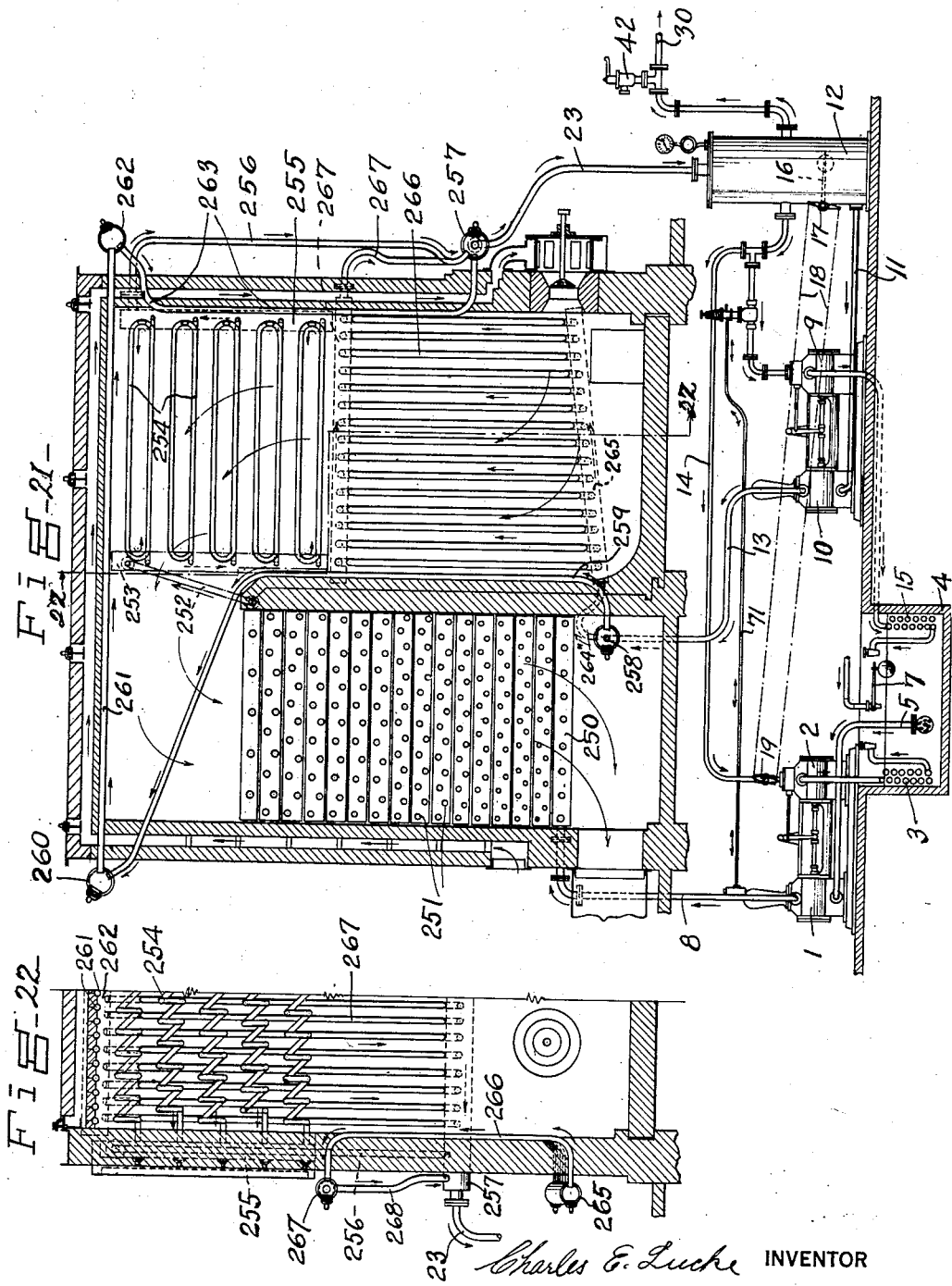
Charles E. Lucke INVENTOR
BY
Gifford & Scull
ATTORNEYS

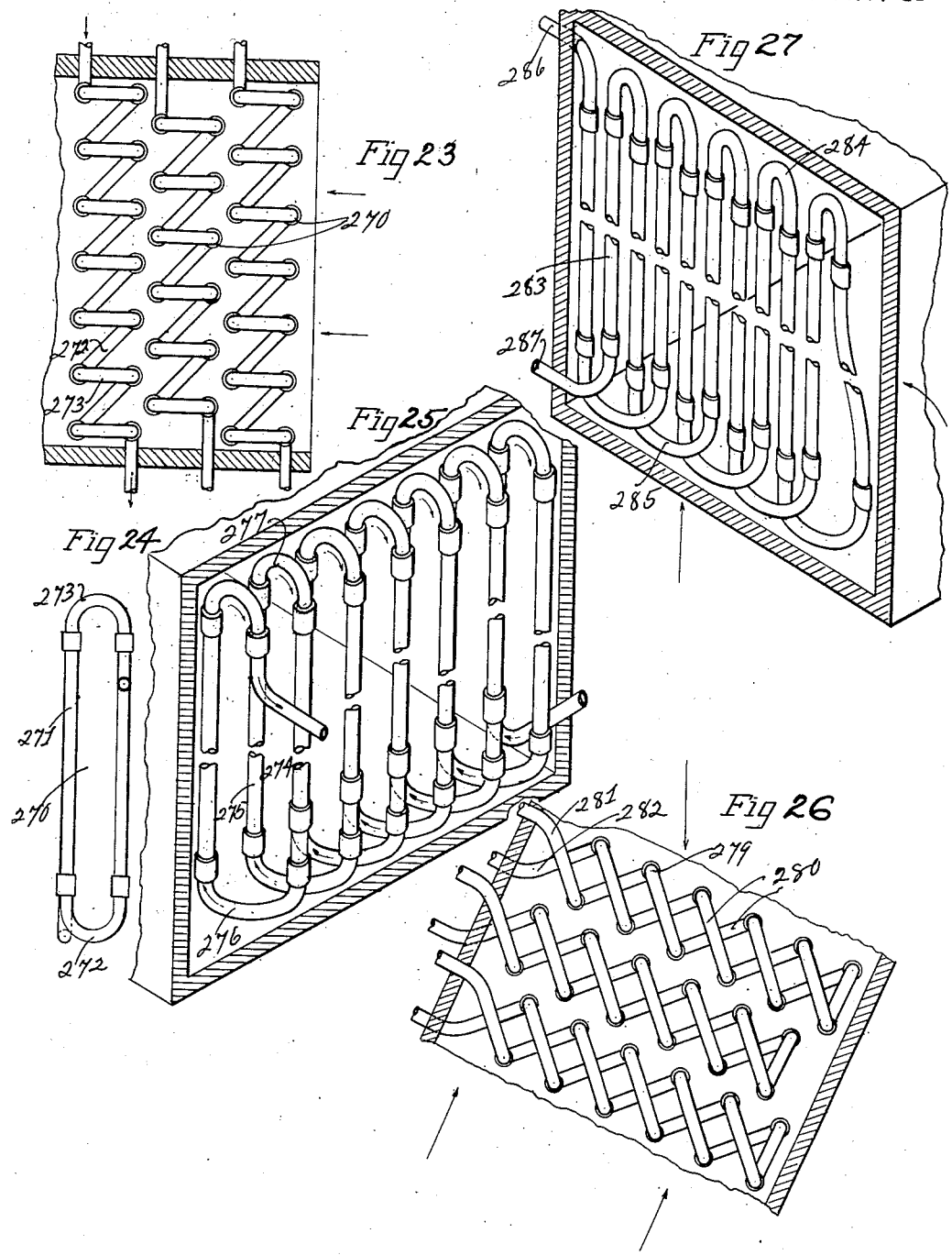

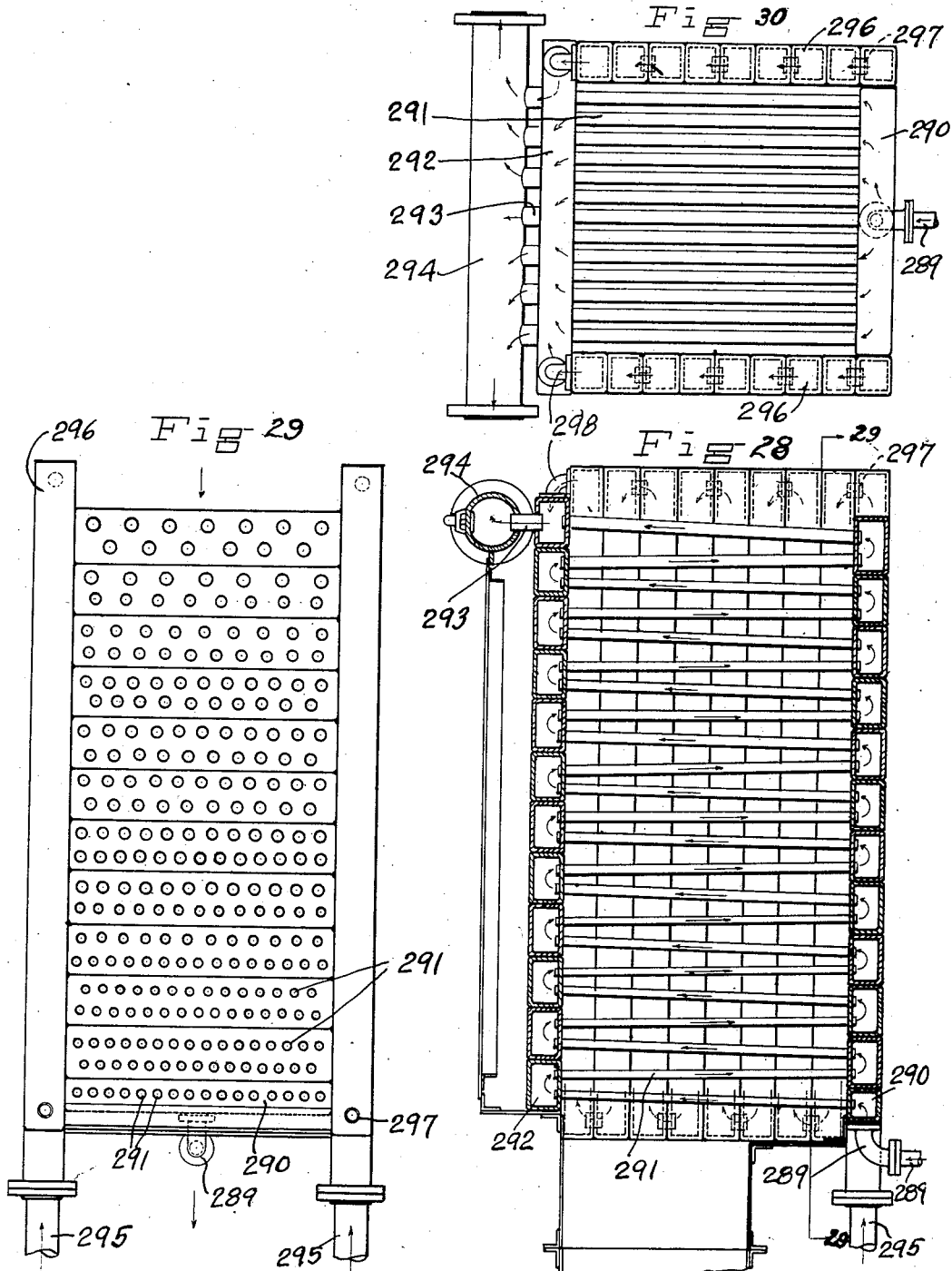

Feb. 21, 1933.　　　　　C. E. LUCKE　　　　　1,898,196
DOUBLE CIRCUIT FORCED CIRCULATION WATER TUBE BOILER
Filed Jan. 3, 1927　　　13 Sheets-Sheet 13
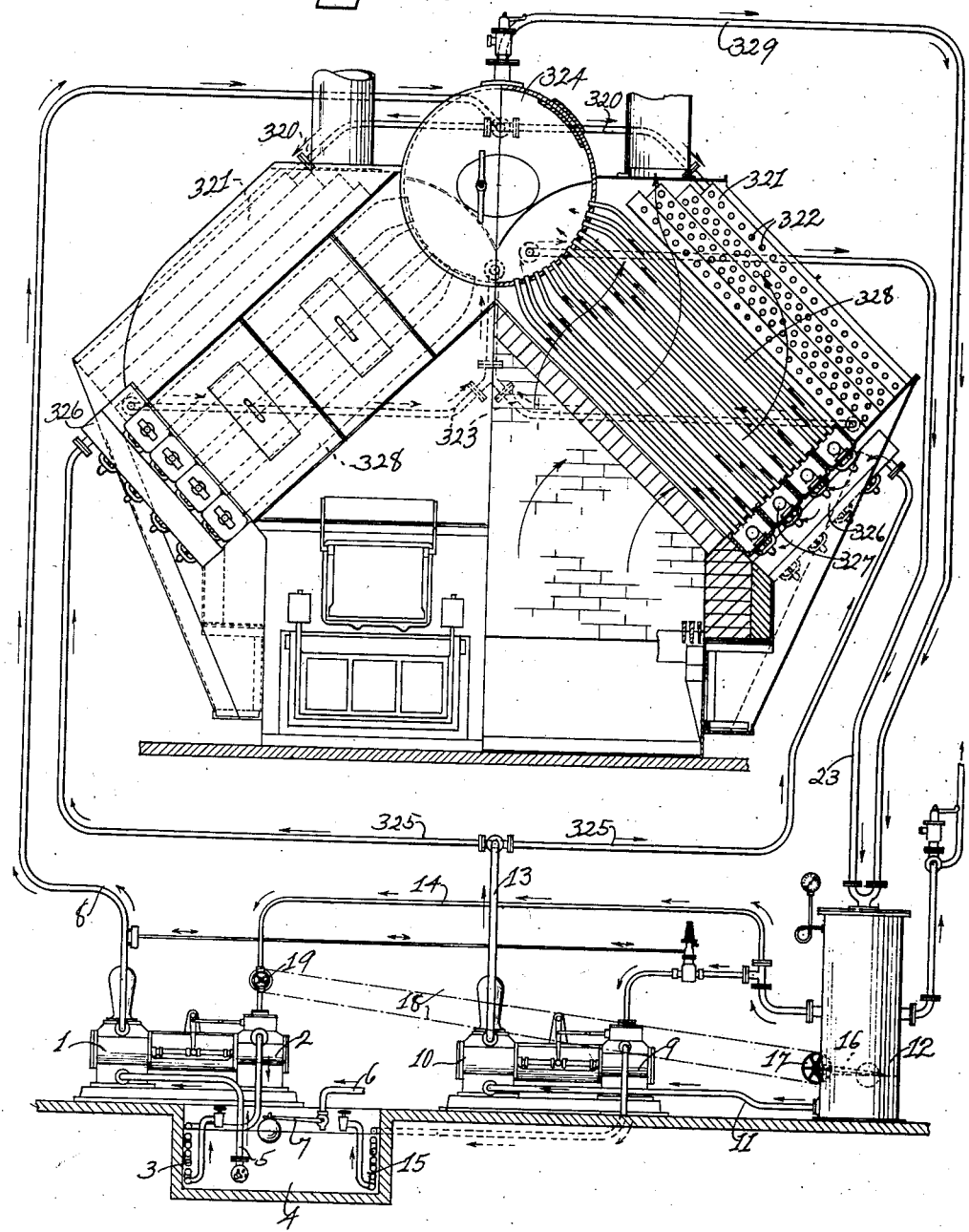
Charles E. Lucke INVENTOR
BY
Gifford & Scull
ATTORNEYS Patented Feb. 21, 1933

1,898,196

UNITED STATES PATENT OFFICE

CHARLES E. LUCKE, OF NEW YORK, N. Y., ASSIGNOR TO THE BABCOCK & WILCOX COMPANY, OF BAYONNE, NEW JERSEY, A CORPORATION OF NEW JERSEY

DOUBLE CIRCUIT FORCED CIRCULATION WATER TUBE BOILER

Application filed January 3, 1927. Serial No. 158,470.

This invention relates to steam boilers in which there is a double circuit including forced circulation of water through tubes or tube coils. Tubes or tube coils are fed with feed water for the boiler by a feed pump, and other tubes or tube coils preferably independent of the first ones have water circulated through them by means of a separate circulation pump. Water or a mixture of steam and water flows from the tubes fed by the feed water pump into a collector or steam and water separator that is located preferably below the level of water in the highest tubes, and the level of the water in this collector or steam and water separator controls the rate at which water is fed into the boiler to replace steam made. Water from the collector or steam and water separator is fed through the circulation tubes by an independent pump at a rate that is controlled by the rate at which water is fed to the boiler, or the rate of steam generation. The rate of circulation varies with the rate of steam generation, but the means of circulation is independent of feed. Tubes may be arranged to receive water from both pumps.

The invention will be understood from the description in connection with the accompanying drawings, in which Fig. 1 is a vertical section through an embodiment of the invention; Fig. 2 is a vertical section through a steam and water separator; Fig. 3 is a section along the line 3—3 of Fig. 2; Fig. 4 is a vertical section through a control valve for the feed pump; Fig. 5 is a section of a portion of Fig 4, partly broken away, on a larger scale; Fig. 6 is a vertical section through a valve for controlling the circulation pump; Fig. 7 is a similar view showing a different position of the valve; Fig. 8 is a vertical section through a modification; Figs. 9 to 13 are sections showing tube connectors; Figs. 14, 15 and 16 are sectional views showing details of control valves and their connections; Fig. 17 is a vertical section through a combined steam turbine and centrifugal pump for circulating the water; Fig. 18 is a section along the line 18—18 of Fig. 17; Fig. 19 is a perspective view showing an arrangement of the tubes in a furnace; Fig. 20 is a vertical section through another modification; Fig. 21 is a vertical section through another modification; Fig. 22 is a section along the line 22—22 of Fig. 21; Figs. 23 to 27 are perspective views showing arrangements of tubes in a hot gas passage; Fig. 28 is a vertical section showing an arrangement of tubes and headers; Fig. 29 is a section along the line 29—29 of Fig. 28; Fig. 30 is a plan view corresponding to Fig. 28; and Fig. 31 is a vertical section through another modification of the invention.

In the drawings reference character 1 indicates the water cylinder of a feed pump, of which the steam cylinder is shown at 2. The exhaust from the steam cylinder goes into a coil 3 in the feed water tank 4 where it is condensed. A suction pipe 5 leads from the feed water tank to the water cylinder 1 and a feed water pipe 6 from any convenient source leads to the tank 4, and is provided with a float 7 to maintain the water level therein. The feed water pipe 8 leads from the water cylinder 1 to the boiler.

A centrifugal circulating pump 10, driven by a steam turbine 9 is connected by the pipe 11 to the steam and water separator 12, and an outlet pipe 13 for the water leads from this pump. A steam exhaust pipe leads from the turbine 9 through the coil 15 in the tank 4 where steam is condensed.

Water passes through the feed water pipe 8 to the lower header 20 of a series along the side of the flue 21, and passes through tubes 22 and the other headers of the series, thence through pipe 23 to a preliminary steam and water separator 24. The steam that is separated passes through the pipe 25 to the separator 12, and the water passes through the pipe 26 to a lower part of the separator 12. The upper end of the pipe 26 is provided with a sealing outlet 27 to maintain the water level in the separator 24. A steam pipe 28 leads from the steam space of the separator 12 to the drum 29 of the superheater, from which superheater the pipe 30 leads to the steam main. The steam and water separator 12 is provided with a feed water pump control 31 that is to be described more in detail below.

Circulating water from the separator 12 is forced by the pump 10, through the pipe 13 into distributing headers 33 and 34 located respectively at the front and at the sides of the furnace 36 that may be provided, for example, with a chain grate stoker 37, although this furnace may be heated in other ways as, for example, by means of powdered fuel or oil burners. The water passes from the header 33 through a row of slag screen tubes 38 to the header 39, from which it passes through the tubes 40 to the drum 41 that is provided with a safety valve 42. A mixture of steam and water passes from the drum 41 through the pipes 43 and 44 to the separator 24.

Circulating water also passes from the header 33 through horizontal wall cooling tubes 45 to the header 46, thence through a row of tubes 47 at the top of the furnace to the drum 41.

Circulating water also passes from the side headers 34 through side wall cooling tubes 48 to the upper headers 49 on each side of the furnace, thence through pipes 50 and 44 to the separator 24. It will thus be seen that the feed water pump forces feed water through the pipe 8 and tubes 22 into the separator 24, which passes into the separator 12 from the bottom portion of which the water is circulated by means of the independent circulating pump 10 through other tube banks to the separators 24 and 12 with a repetition of the circuit for all water that is not evaporated the first time and with addition of feed water to replace water that did evaporate.

The separators 12 and 24 are more clearly shown in Figs. 2 and 3. The mixture of steam and water enters the preliminary separator 24 through the pipe 44, steam passing through the connection 25 and water through the connection 26 to the separator 12. The water level in the separator 24 is kept at the dotted line by the sealing outlet 27. Water collects in the lower part of the separator 12 and is withdrawn therefrom through the pipe 11 by means of the circulating pump 10. The steam and some water entering through the pipe 25 passes helically around the pipe 28 that extends into the separator 12, being guided along the warped plate 51 located between the pipe 28 and a perforated cylinder 52 spaced a short distance from the inner walls of the separator 12. The water is thrown by centrifugal force through the perforations in the cylinder 52 and trickles down in the annular space between the cylinder 52 and the inner walls of the separator 12, while the steam passes downwardly and enters the lower end of the pipe 28.

The feed water pump control 31 is shown in detail in Figs. 4 and 5. A steam connection 53 and a water connecton 54 extend between the separator 12 and the regulator 31 and a steam pipe 55 extends from the steam space of this regulator into the lower valve compartment 56 that is provided with an automatically adjustable valve that is regulated by the depth of water in the separator 12. The regulator 31 has a valve compartment 56 separated from the other part by flexible discs 57 whose edges are connected together, the upper one being connected to the screw plug 58, while the lower one carries a washer 59 attached to the rod 60. The rod 60 is attached to a sleeve 61 that embraces a valve member 62 provided with perforations 63, the sleeve 61 being pressed upwardly by means of a spring 64 bearing against a flange 65 on the sleeve. A pipe 14 leads from the valve member 56 to the steam cylinder 2 of the feed pump. The static head of the water in the pump control 31 expands the discs 57 and compresses the spring 64, thus closing some of the ports 63 and cutting off part of the supply of steam to the cylinder, as the water level in the separator 12 rises, and the spring 64 expands and admits more steam as the static head of the water in the pump control 31 decreases, due to the lowering of the water level in the steam and water separator 12.

The circulating pump 10 is controlled by a valve 70, as most clearly shown in Figs. 6 and 7, and is operated by the differential in pressure between the outlet 8 of the feed water pump cylinder 1 and the inlet 23 to the steam and water separator 24. This pressure differential increases with the rate of feed of the water due to the frictional drop through the economizer that comprises the header 20 and tubes 22. A pipe 71 leads from the valve 70 to the pump cylinder outlet pipe 8 and a pipe 72 leads from the valve 70 to the pipe 23 of the inlet side of the steam and water separator 24. The valve 70 is, therefore, controlled by the amount of feed water entering the boiler, or approximately the rate of steam generation. The differential in pressure in the pipes 71 and 72, which varies with feed water delivered to the boiler, causes the piston 73 to move upwardly and compress the spring 74 and open the valve 75 to regulate the amount of steam that passes from the pipe 76 to the valve 75, and then through the pipe 77 to the steam turbine 9, driving the circulating pump 10. Fig. 6 shows the valve 75 almost closed and Fig. 7 shows the same in its maximum open position. The operation of the valve 75 may be regulated by the adjustable screw 78 bearing upon a disc at the upper end of the spring 74. In some of the other modifications, the same sort of feed and circulating pumps and regulators therefor are used, as those already described, and it is not thought necessary to describe the same in detail again. They will, in general, be referred to by the same reference characters.

In the modification shown in Fig. 8, two feed pumps and two circulating pumps are connected in parallel. Feed water flows from the pipe 8, that is provided with an air relief valve 80 at the uppermost portion thereof, to branch pipes 81 that enter headers 82, from each of which water flows through wall cooling tubes 83 to a drum 84, thence through tubes 85 to the drum 86, through the tubes 87 to the to the drum 88, through the tubes 89 to the tube connector 90 in the drum 91, thence through tubes 92 to the steam and water drum 93 provided with a float 98, from which the steam passes through the pipe 94 to the steam main.

Steam passes from the steam space of the steam and water drum 93 through the pipe 95 to branch pipes 96 and 97 that lead to the steam cylinders 2 and 2' of the feed pumps. A float 98 in the steam and water drum 93 controls a valve in the pipe 8, thus regulating the amount of feed water that passes through the pipe 8 to the boiler.

The water passes through a water pipe 100 leading from the water space of the steam and water drum 93 by means of branch pipes to the circulating pumps 10 and 10', the outlets of which lead through the pipes 13 and 13' to branch pipes 101 and 102 to the drum 91. It then passes through tubes 103 between the drums 91 and 93 into tube connectors 104 inside of drum 93 back and forth through tubes between the drums 91 and 93 and through tube connectors until the mixture of steam and water passes through the last group 105 of tubes into the steam and water drum 93.

The circulating pump control valve 70' of a type to be described below is controlled by rate of feed water that goes through pipe 8.

Modifications showing types of tube connectors that may be used in the drums 91 and 93 are shown in Figs. 9 to 13. In Figs. 9 and 10 tube connectors 110 are shown that are semicircular in cross section and have their edges fitting against the inside wall of the drum. These connectors each extend circumferentially sufficient distances to span two rows of tubes and extend longitudinally along the row of tubes. They are held in place against the inner wall of the drum by means of screw threaded bolts 111 passing through the ring 112 that is held in place by the bolts 113. In the modification shown in Fig. 12, the tube connector 114 is retained in position against the drum by means of the bolt 115, extending through the drum wall with a nut 116 bearing upon a seat on the outer surface of the connector 114. In the modification shown in Figs. 11 and 13 the tube connector 117 is kept in place by bolts 118 passing through the drum wall and through lugs 119 on the connector. The connector may be divided into sections by partitions 120. It is obvious that with tube connectors inside of drums it is not necessary to make water and steam tight joints, as a small amount of leakage along the inner walls of the drum is immaterial.

In Figs. 14, 15 and 16 are shown details of a modification of the circulating pump control valve mentioned in connection with Fig. 8. This valve or control device may be operated by the feed water that is discharged from the feed water pump or by the amount of steam discharged into the mains. The water or steam passing out causes the valve 156 to move to the left, thereby compressing spring 157 and bringing the ports 158 and 159 into alignment, thus regulating the pressure in the pipe 160 and lifting the piston 161 against the springs 162 and opening the valve 163 and permitting more steam to flow through the pipe 77. This causes the circulating pump to circulate water more rapidly as more water is being fed to the boiler or more steam is being generated. A needle valve 164 is provided in a bypass 165 to set the device so that the valve 163 will be open the proper amount with different feed water rates or rates of steam generation.

In the modification shown in Fig. 20, the feed water passes from the pipe 8 into the header 230, thence through tubes 231 and tube connectors 232 to the header 233, thence through curved wall tubes 234 to the steam and water drum 235, from which a mixture of steam and water passes through the pipe 23 to the steam anud water separator 12.

Circulating water passes from the steam and water separator 12 through the pipe 11 and is forced by the water cylinder 10 of the circulating pump through the pipe 13, where it branches, a portion going to the header 236, where it again divides. A portion goes through the wall cooling tubes 237 to the header 238, thence through a row of roof tubes 239 to the steam and water drum 235. Another portion goes through the row of slag screen tubes 240, through the furnace wall cooling tubes 241 to the header 242, thence through curved tubes 243 to the header 244, thence through the connection 245 to the steam and water drum 235.

The other portion of the circulating water from the pipe 13 passes into lower headers 246 on each side of the furnace, and thence through side wall cooling tubes 247 to the upper headers 248, thence through connection 249 to the steam and water drum.

The float mechanism 16 in the steam and water separator 12 controls the valve 19 in the steam pipe 14 that supplies steam to the feed water pump, thus regulating the feed water by the water level in the steam and water separator. The valve 70' is controlled by rate of feed water through the feed water pump outlet 8, and is located in the steam pipe 77 leading to the steam cylinder of the circulating pump, so that the rate of the circulating pump is controlled as above described in connection with Fig. 8, by the amount of feed water or rate of steam generation.

In the modification shown in Figs. 21 and 22, the feed water passes from pipe 8 into the lowest one of a series of headers 250, thence through tubes 251 connecting these headers, thence through connection 252 to a vertical header 253 thence through tube coils 254 to the vertical header 255, thence through connection 256 to header 257 and pipe 23 to the steam and water separator 12.

Circulating water passes from the pipe 13 to the header 258 where it divides, a part passing through the row of side wall cooling tubes 259 to the header 260, thence through the row of roof tubes 261 to the header 262, thence through side wall cooling tubes 263 to the header 257, thence to the steam and water separator. Another portion of the circulating water passes from the header 258, through the connection 264 into the lower headers 265 on each side of the furnace, thence through the side wall cooling tubes 266 into upper headers 267, thence through connection 268 to the header 257 and the steam and water separator 12.

The speed of the feed water pump is controlled by the water level in the steam and water separator 12 as heretofore described, and the speed of circulating pump is controlled by the valve 70′, similar to that already described, thus causing the circulation to depend upon the rate at which feed water is fed.

Figs. 23 to 26 show details of various arrangements of the manner in which the coils may be installed in the feed water circuit and the way they are contacted by the hot furnace gases. In Figs. 23 and 24 the water passes in parallel through the tube coils 270, each one of which is made up of straight portions 271, connected at their respective ends by connections 272 and 273. In the modification shown in Fig. 25 the coils are made up of straight tubes 274 and 275 connected at their ends by bends 276 and 277. In the modification shown in Fig. 26, the coils are made up of straight tubes 279 having their ends joined by connectors 280, the tube being so connected that the water enters as shown at 281 and leaves at 282. In the modification shown in Fig. 27 the coil is made up of straight portions 283, connected by short bends 284 at one end and longer bends 285 at the other end, the water entering at 286 and leaving at 287.

Figs. 28, 29 and 30 show details of the way in which the tubes or tube coils of the feed circuit may be installed to give a decreasing area for gas flow by graduated closer spacing as the gases cool so as to keep up the rate of heat absorption. Feed water enters from pipe 289 into the lowest side header 290 and passes through the lowermost row of tubes 291 into the header 292 on the other side of the flue, back through the next higher row of tubes 291 and side headers 290, 292 and so on, passing into the uppermost header 292 through nipples 293 into drum 294. The number and sizes of the tubes 291 are so arranged as to have a larger area for the gas flow where the gases are hottest, gradually decreasing as the gases are cooled. Feed water also passes from pipes into the lower ends of the vertical side headers 296 to the upper ends thereof, thence through nipples 297 to the adjacent headers, thence passing to the lower ends and crossing into the next headers in a similar way, and so on up and down along both sides of the flue, passing through connections 298 into the topmost header 292, thence through nipples 293 into the drum 294, which may be connected to a steam and water separator.

In the modification shown in Fig. 31, feed water passes from the pipe 8 by branch pipes 320 into the headers 321 from whence it passes through tubes 322 into successive headers of the series, and finally through connections 323 to the steam and water drum 324. A mixture of steam and water passes from the steam and water drum 324 through pipe 23 to the steam and water separator 12.

Circulating water passes from the outlet pipe 13 of the circulating pump through the branch pipes 325 to headers 326 on each side of the boiler, thence into cross headers 327 and banks of parallel tubes 328 on each side of the steam and water drum 324. The pipe 329 leads from the steam and water drum 324 to the steam space of the steam and water separator 12.

The speed of the feed water pump is regulated by the water level in the steam and water separator 12, and the speed of the circulating pump is regulated by the valve 70′, as heretofore described.

I claim:

1. In a water tube boiler, water tubes heated by gases from a fire, a plurality of pumps arranged in two independent sets, one set for forcing feed water through tubes of said boiler, the other set for circulating water in excess through tubes of said boiler, means for separating steam from water discharged from said tubes and for returning said water to said set of circulating pumps, and means controlled by the flow of the feed water for varying the quantity of the circulating water so that it increases and decreases with the increase and decrease of the feed water.

2. In a water tube boiler, water tubes heated by gases from a fire, a plurality of pumps arranged in two independent sets, one set for forcing feed water through tubes of said boiler, the other set for circulating water in excess through tubes of said boiler, means for separating steam from water discharged from said tubes and for returning said water to said set of circulating pumps, and means for varying the quantity of the circulating water so that it increases and decreases with the increase and decrease of the feed water, said means being regulated by the velocity of flow in the feed water path.

3. In a water tube boiler, water tubes heated by gases from a fire, a plurality of pumps arranged in two independent sets, one set for forcing feed water through tubes of said boiler, the other set for circulating water in excess through tubes of said boiler, means for separating steam from water discharged from said tubes and for returning said water to said set of circulating pumps, and means for varying the quantity of the circulating water so that it increases and decreases with the increase and decrease of the feed water, said means being regulated by the difference in pressure at two separated points in the feed water flow path.

4. In a water tube boiler, water tubes located in position to receive radiant heat from the furnace, economizer tubes, a plurality of pumps arranged in two independent sets, one set for forcing feed water through the economizer tubes, the other set for circulating water in excess through said first named water tubes, means for separating steam from water discharged from said tubes and for returning said water to said set of circulating pumps, and means for varying the rate of flow of the circulating water so that it increases and decreases with the increase and decrease in the rate of delivery of the feed water.

5. In a steam generating system, water tubes, a feed water pump and a circulating pump, each independently connected to deliver water to said tubes, the circulating pump always delivering more water to the tubes than can be evaporated thereby, a steam and water separator having its water compartment connected to said circulating pump, regulating means for said circulating pump, and means connected with the feed water discharge and said regulating means for actuating the regulating means by changes in physical characteristics of the flow in the feed water pump discharge.

6. In a steam generating system, water tubes, a feed water pump and a circulating pump, each independently connected to deliver water to said tubes, the circulating pump always delivering more water to the tubes than can be evaporated thereby, a steam and water separator having its water compartment connected to said circulating pump, regulating means for said circulating pump, means connected with the feed water discharge and said regulating means for actuating the regulating means by changes in physical characteristics of the flow in the feed water pump discharge, and means regulated by the amount of water in said system for increasing and decreasing the feed water pump discharge.

7. In a steam generating system, water tubes, a feed water pump and a circulating pump each independently connected to deliver water to said tubes, the circulating pump always delivering more water to the tubes than can be evaporated thereby, a steam and water separator having its water compartment connected to said circulating pump, and a pressure differential control for said circulating pump and connected across a section of the feed water pump discharge whereby resistance to flow through said section governs the discharge ability of the circulating pump.

8. In a steam generating system, water tubes, a feed water pump and a circulating pump each independently connected to deliver water to said tubes, the circulating pump always delivering more water to the tubes than can be evaporated thereby, a steam and water separator having its water compartment connected to said circulating pump, a pressure differential control for said circulating pump and connected across a section of the feed water pump discharge whereby resistance to flow through said section governs the discharge ability of the circulating pump, and means regulated by the amount of water in the system for increasing and decreasing the discharge from the feed water pump.

9. A steam generator comprising a sequence of groups of tubes forming a series flow path, a steam and water separator receiving the discharge from said tubes, feed water means supplying more water than can be converted into steam in said tubes, differential fluid velocity regulated pumping means recirculating the separated water, means actuated by the water level in said separator for controlling the admission of water to the generator and secondarily affecting the actuation of the differential fluid velocity regulated pumping means.

10. A steam generator comprising a sequence of groups of tubes forming a series flow path, a steam and water separator receiving the discharge from said tubes, feed water means supplying more water than can be converted into steam in said tubes, duplicate differential fluid velocity regulated pumping means recirculating the separated water, means actuated by the water level in said separator for controlling the admission of water to the generator and secondarily affecting the actuation of the duplicate differential fluid velocity regulated pumping means.

11. A steam generator comprising a sequence of groups of tubes forming a series flow path, a steam and water separator receiving the discharge from said tubes, means for supplying feed water to said generator in accordance with the rate of steam generation, a plurality of simultaneously operating circulating pumps for recirculating the water separated out in said steam and water separator through a portion of said tube groups, a common source of motive fluid connected to said circulating pumps, means for jointly controlling the supply of motive fluid to said circulating pumps in accordance with the rate of flow of feed water to said tube groups, and means for independently controlling the operation of each of said circulating pumps.

CHARLES E. LUCKE.